3 Sheets—Sheet 1.

A. SENEFF & A. HOEFFER.
Vegetable-Cutter

No. 203,078. Patented April 30, 1878.

Attest:
J. W. Read.
August Petrasch

Inventor:
Albert Seneff & Albert Hoeffer,
by C. A. Snow & Co,
attys.

3 Sheets—Sheet 2.

A. SENEFF & A. HOEFFER.
Vegetable-Cutter

No. 203,078. Patented April 30, 1878.

Attest:
J. W. Read.
August Petersohn.

Inventor:
Albert Seneff & Albert Hoeffer,
by C. A. Snow & Co,
attys.

3 Sheets—Sheet 3.

A. SENEFF & A. HOEFFER.
Vegetable-Cutter

No. 203,078. Patented April 30, 1878.

Attest:
J. W. Read.
August Hersohn.

Inventor:
Albert Seneff & Albert Hoeffer,
by C. A. Snow & Co.
Attys.

UNITED STATES PATENT OFFICE.

ALBERT SENEFF AND ALBERT HOEFFER, OF POTTSVILLE, PENNSYLVANIA; SAID SENEFF ASSIGNOR TO SAID HOEFFER.

IMPROVEMENT IN VEGETABLE-CUTTERS.

Specification forming part of Letters Patent No. 203,078, dated April 30, 1878; application filed November 19, 1877.

*To all whom it may concern:*

Be it known that we, ALBERT SENEFF and ALBERT HOEFFER, of Pottsville, in the county of Schuylkill and State of Pennsylvania, have invented certain new and useful Improvements in Vegetable-Cutters; and we do hereby declare that the following is a full, clear, and exact description thereof, which will enable others skilled in the art to which it appertains to make and use the same, reference being had to the accompanying drawings, which form a part of this specification, and in which—

Figure 1:
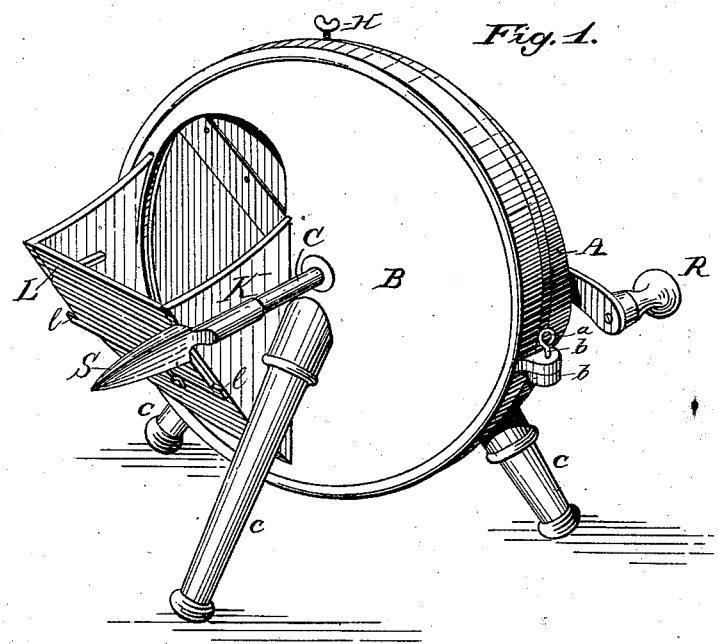
Figure 2:
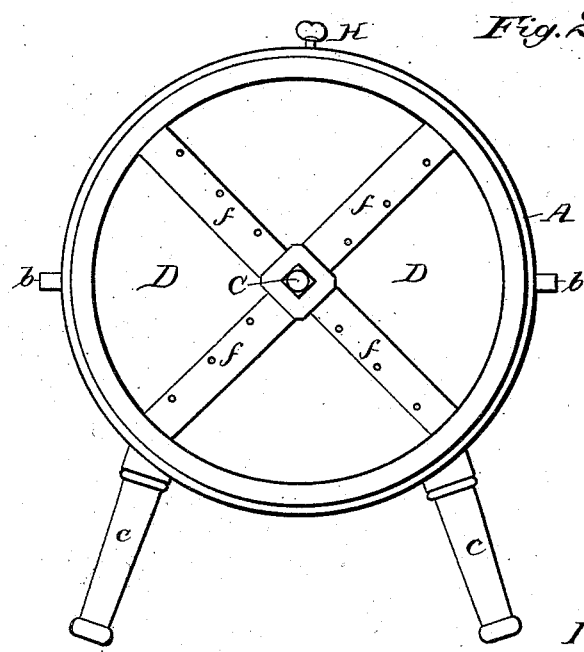
Figure 3:
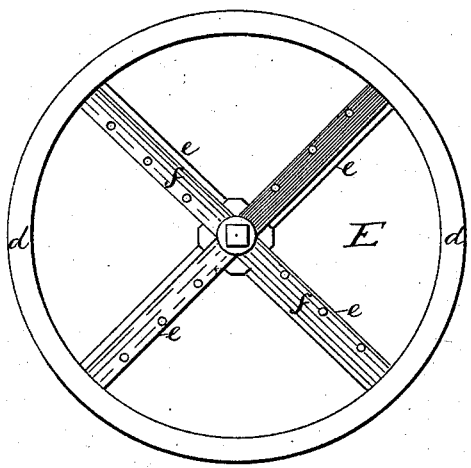
Figure 4:
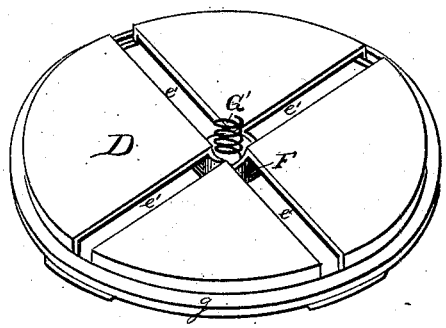
Figure 6:
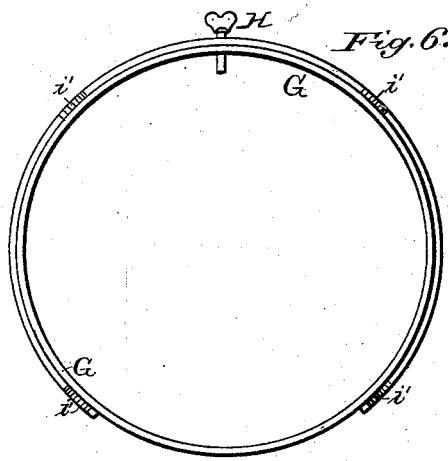
Figure 10:
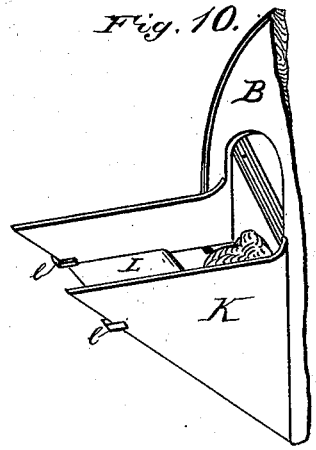
Figure 7:
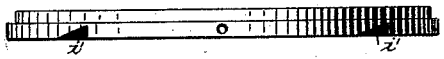
Figure 5:
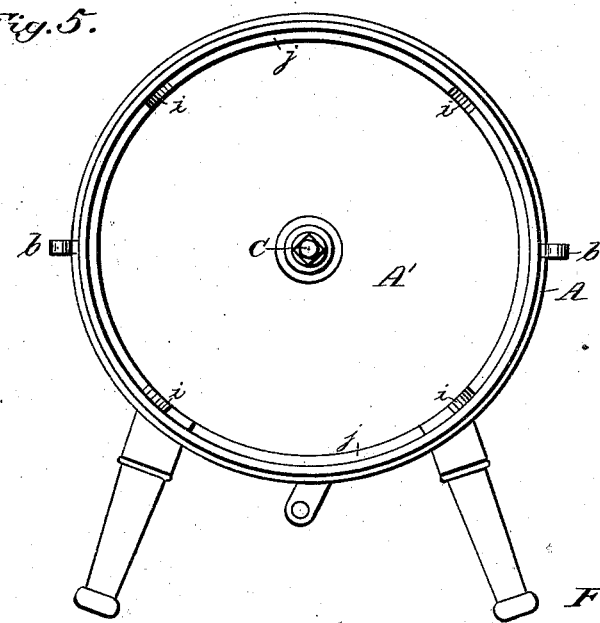
Figure 8:
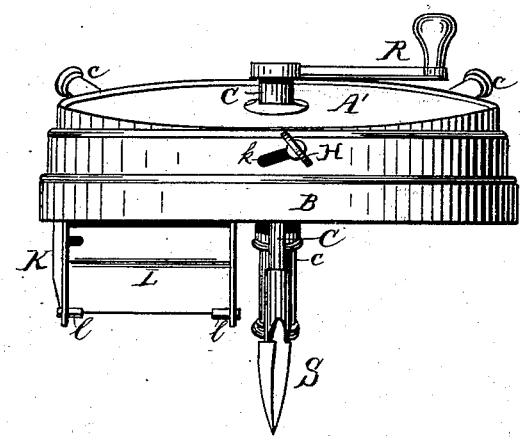
Figure 9:
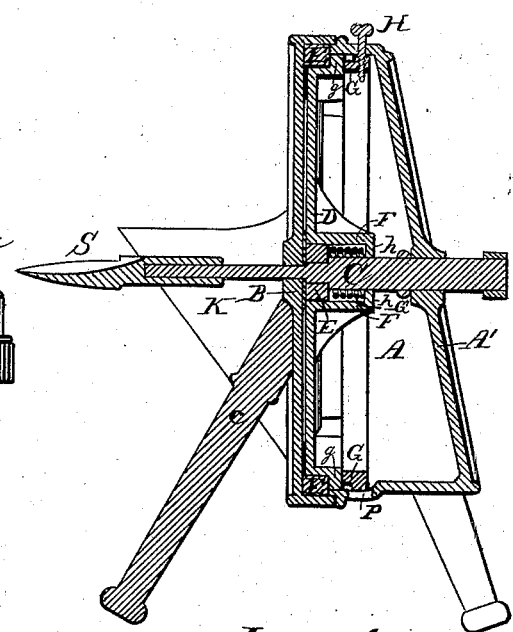

Figure 1 is a perspective view. Fig. 2 is a front view, the cover being removed. Fig. 3 is a rear view of the knife-carrying wheel. Fig. 4 is a perspective view of the rotating disk D, with the spring. Fig. 5 is a plan view of the case, all the working parts being removed. Fig. 6 is a rear view of the adjusting-ring. Fig. 7 is an edge view of the same. Fig. 8 is a top view of the machine complete. Fig. 9 is a vertical cross-section; and Fig. 10 is a detail view, showing the construction of the hopper.

Similar letters of reference denote corresponding parts in all the figures.

This invention relates to that class of vegetable-cutters which are provided with rotating knives for slicing cabbages, potatoes, turnips, &c., for food for stock, or other purposes; and it consists in the improved construction and arrangement of parts, which we shall now proceed more fully to describe with reference to the drawings hereto annexed, in which—

A is a flat cylindrical case, cut off obliquely on the rear side, and provided with a cover, B, secured to it by means of pins $a\ a$, passing through perforations in lugs $b\ b$ upon the sides of the case and cover. The case is supported upon legs $c\ c\ c$, one of which is or may be secured upon the front side of the cover, as shown in the drawing.

C is a shaft, passing centrally through the box or case, in the rear side A′ and cover B of which it has its bearings. Upon it are supported the disk D and the knife-carrying wheel E. The latter consists of a ring, $d$, having beveled radial arms $e\ e$, upon the outer flat sides of which the knives or cutters $f\ f$ are secured by rivets, or in any other suitable way. The disk D has several radial slots, $e'$, corresponding in number and position to the arms of wheel E, which fit therein. It is provided with a rim or flange, $g$, and a central tubular bearing, F, flanged on one side, at $h$, so as to fit upon the shaft C, and accommodating the coiled spring G′, which is coiled around the shaft. The shaft at this point is square, to correspond with the central square perforation in the wheel E, which rotates with the shaft, and carries with it the disk D. The case A has a shoulder, $j$, upon which are arranged three, four, or more blocks, $i\ i$, having beveled faces.

G is a metallic flanged ring, which rests upon the shoulder $j$, and is provided with several slanting cuts, $i'\ i'$, corresponding in size, shape, and position to the blocks or projections $i\ i$, which, when the ring G is adjusted in its proper position upon shoulder $j$, fit in the said cuts or recesses $i'\ i'$.

H is a clamping-screw, fitting in a screw-threaded perforation in the edge of ring G, and projecting through a slanting slot, $k$, in the upper edge of case A. When the screw H is loosened it forms a handle, by which the ring G may be slightly turned, the extent of such motion being confined by the slot $k$, through which the shank and head of screw H project. When thus turned, the ring G is forced outward from shoulder $j$ by the beveled blocks $i\ i$ upon the latter. The disk D, it will be observed, rests upon the ring G; consequently, when the latter is operated, as just described, it carries with it the disk D, the face of which is thus brought closer to the edges of the knives upon the wheel E. The result is, that when the machine is again operated, the slices cut are thinner than those cut before. The thickness of the slices may thus be easily and rapidly regulated without detaching the knives, or even displacing them.

Upon the cover B is arranged a hopper, K. The cover for this is formed by a sliding board, L, held in place by lugs $l\ l$, and forming, when open, as shown in Fig. 1, a continuation of one side of the hopper. When folded down, as shown in Fig. 10, the cover forms a table or rest, for the purposes hereinafter set forth.

The shaft C projects beyond the front or cover B, as shown in the drawings. S is a pointed spoon-shaped knife, which may be adjusted upon the end of it, as shown, it being very convenient for "coring" cabbages and other vegetables, previous to throwing them in the hopper for the purpose of being chopped or sliced.

The operation and advantages of our invention will be readily understood from the foregoing description, and by reference to the drawings hereto annexed. The vegetables to be sliced are thrown into the hopper K, and the shaft C is rotated by means of a crank, R, upon the rear end thereof. The knife-carrying wheel E, which rotates with the shaft, is forced, by the coiled spring G', against the lower edge of the hopper, thus causing the knives to carve slices of the vegetables contained therein of a thickness which may be regulated by the adjustable disk D, in the manner herein described.

The cover on the hopper, when folded down, forms a convenient rest upon which dried or smoked beef and other similar articles may be held for slicing or chipping. The cut-off slices fall down through the body of case A, and out through a slot, P, in the bottom thereof, below which a suitable receiver may be placed.

The general construction of our invention is simple, so that it may be manufactured and placed in the market at a small cost. It is easily operated, and the thickness of the slices to be cut being easily and perfectly regulated, it may be used with equal success for a variety of purposes.

Having thus described our invention, we claim and desire to secure by Letters Patent of the United States—

1. The combination of the case A, having shoulder $j$, beveled blocks $i\ i$, and slanting slot $k$, with the ring G, having slanting cuts or recesses $i'\ i'$, corresponding to the blocks $i\ i$ on shoulder $j$, and the clamping-screw H, substantially as described, for the purpose herein set forth.

2. The combination of the case A, constructed substantially as herein described, adjustable ring G, having set-screw H, disk D, having radial cuts $e'$, knife-carrying wheel E, and cover B, all arranged and operating substantially in the manner described, for the purposes herein set forth.

3. In a vegetable-cutter, constructed substantially as herein described, the combination of the adjustable disk D, knife-carrying wheel E, and coiled spring G', the latter arranged in such a manner as to force the disk D backward from the wheel, substantially as and for the purpose herein shown and specified.

4. The hopper K, having sliding cover L, held in place by lugs $l\ l$, and forming, when closed, a table upon which material may be placed for chipping or slicing, substantially as described, for the purpose set forth.

5. The improved machine for cutting and slicing vegetables herein described, consisting, essentially, of the case having opening P, detachable cover B, having hopper K, shaft C, adjustable ring G, disk D, spring G', and knife-carrying wheel E, all combined, arranged, and operating substantially in the manner herein described, and for the purposes shown and specified.

In testimony that we claim the foregoing as our own we have hereto affixed our signatures in presence of two witnesses.

ALBERT SENEFF.
ALBERT HOEFFER.

Witnesses:
J. K. FERNSLER,
J. J. FERNSLER.